(12) United States Patent  
Bartlett

(10) Patent No.: US 12,535,141 B2
(45) Date of Patent: *Jan. 27, 2026

(54) REDUCED STROKE GATE VALVE

(71) Applicant: Innovex International, Inc., Houston, TX (US)

(72) Inventor: Chris D. Bartlett, Spring, TX (US)

(73) Assignee: Innovex International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/951,151

(22) Filed: Nov. 18, 2024

(65) Prior Publication Data

US 2025/0075800 A1 Mar. 6, 2025

Related U.S. Application Data

(63) Continuation of application No. 17/083,041, filed on Oct. 28, 2020, now Pat. No. 12,181,065.

(Continued)

(51) Int. Cl.
*E21B 33/035* (2006.01)
*E21B 33/04* (2006.01)
(Continued)

(52) U.S. Cl.
CPC .......... *F16K 3/0209* (2013.01); *E21B 33/035* (2013.01); *E21B 33/04* (2013.01);
(Continued)

(58) Field of Classification Search
CPC ........ E21B 33/04; E21B 34/02; E21B 33/035; E21B 34/04; F16K 3/0209; F16K 3/0227; F16K 3/00

See application file for complete search history.

(56) References Cited

U.S. PATENT DOCUMENTS 3,039,638 A 6/1962 Shaffer
3,149,641 A 9/1964 Norton
(Continued)

FOREIGN PATENT DOCUMENTS

CA 2489079 A1 6/2006
GB 2168463 A1 6/1986
(Continued)

OTHER PUBLICATIONS

Patents Act 1977: Search Report under Section 17(5), Application No. GB2319796.5, dated May 14, 2024, 5 pages.

(Continued)

*Primary Examiner* — Daniel P Stephenson
(74) *Attorney, Agent, or Firm* — Baker Botts L.L.P.

(57) ABSTRACT

A reduced stroke gate valve is provided. The reduced stroke gate valve provides a predetermined or desired flow area for a given bore size through the gate valve while reducing a total length through which the gate valve strokes between an open position and a closed position. The reduced stroke gate valve includes one or more openings that span a non-circular or non-round area within the gate. The non-circular or non-round shape or distribution of opening(s) in the gate may provide a flow area equivalent to a predetermined flow area for a single circular hole that would otherwise be used for the gate valve application, but with a shape or distribution of opening(s) that provides a reduced stroke length to move the gate valve from the open position to the closed position.

20 Claims, 7 Drawing Sheets

Related U.S. Application Data

(60) Provisional application No. 62/927,287, filed on Oct. 29, 2019.

(51) Int. Cl.
  *E21B 34/02* (2006.01)
  *E21B 34/04* (2006.01)
  *F16K 3/00* (2006.01)
  *F16K 3/02* (2006.01)

(52) U.S. Cl.
  CPC .............. *E21B 34/02* (2013.01); *E21B 34/04* (2013.01); *F16K 3/00* (2013.01); *F16K 3/0227* (2013.01)

(56) References Cited

U.S. PATENT DOCUMENTS

| | | | |
|---|---|---|---|
| 3,780,982 A | 12/1973 | Kemp | |
| 4,178,964 A | 12/1979 | Moore et al. | |
| 4,572,298 A | 2/1986 | Weston | |
| 5,022,631 A | 6/1991 | Wagner et al. | |
| 5,165,439 A * | 11/1992 | Krynicki | F16K 17/40 137/39 |
| 5,385,169 A | 1/1995 | Odelius | |
| 6,530,557 B1 | 3/2003 | Guzorek | |
| 12,181,065 B2 * | 12/2024 | Bartlett | F16K 3/0209 |
| 2001/0042848 A1 | 11/2001 | Bartlett | |
| 2012/0319025 A1 | 12/2012 | Shu | |
| 2013/0087733 A1 | 4/2013 | Rolland | |
| 2014/0264099 A1 | 9/2014 | Melancon | |
| 2015/0191994 A1 | 7/2015 | Kobe et al. | |
| 2016/0024878 A1 | 1/2016 | June et al. | |
| 2016/0060995 A1 | 3/2016 | Skeels et al. | |
| 2020/0116263 A1 | 4/2020 | Parks, Jr. | |
| 2020/0248821 A1 | 8/2020 | Parthasarathy et al. | |
| 2021/0123532 A1 | 4/2021 | Bartlett | |
| 2022/0038978 A1 | 2/2022 | Liu et al. | |
| 2023/0175351 A1 | 6/2023 | Holliday et al. | |
| 2025/0075800 A1 * | 3/2025 | Bartlett | E21B 34/02 |

FOREIGN PATENT DOCUMENTS

| | | |
|---|---|---|
| GB | 2341879 A1 | 3/2000 |
| GB | 2621927 A1 | 2/2024 |
| RU | 2672365 C1 | 11/2018 |
| WO | 2000047864 A1 | 8/2000 |
| WO | 2022120123 A1 | 6/2022 |

OTHER PUBLICATIONS

Search Report issued in related United Kingdom Patent Application No. GB2017087.4 dated Mar. 23, 2021, 1 page.

Invitation to respond to written opinion with search report and written opinion, Singapore Patent application No. 10202010649W, mailed May 22, 2025, 10 pages.

* cited by examiner

REDUCED STROKE GATE VALVE

CROSS-REFERENCE TO RELATED APPLICATION

The present application is a continuation application which claims priority to U.S. patent application Ser. No. 17/083,041, filed on Oct. 28, 2020, which claims the benefit of U.S. Provisional Application Ser. No. 62/927,287 filed on Oct. 29, 2019, which are incorporated herein by reference in their entirety for all purposes.

TECHNICAL FIELD

The present disclosure relates generally to gate valves and, more particularly, to a reduced stroke gate valve having a non-circular and/or non-round gate valve opening.

BACKGROUND

A conventional tubing hanger in a wellhead assembly has a vertical production bore and at least one generally vertical annulus bore which is in communication with the tubing annulus between the production tubing and the production casing. The lower end of the annulus bore thus exits the bottom of the tubing hanger, and in a conventional tree or a single-bore tree the upper end of the annulus bore typically exits the top of the tubing hanger for communication with the tree. In a horizontal tree, the well annulus is typically in communication with a lateral bore in the tree housing, which in turn may be connected by a crossover line to a crossover valve, thereby allowing annulus fluids to flow laterally out of the tubing hanger and through the tree body.

Gate valves have sometimes been used to selectively open and close the annulus bore in tubing hangers. Gate valves are generally more reliable for closing off an annulus bore than other types of valves, such as ball valves for example. However, gate valves require a large amount of space for installation and operation, since the tubing hanger must accommodate an actuator system that strokes the gate valve linearly between its open and closed positions. Because room in the tubing hanger must also be provided for various penetrations, such as control lines, the overall length of the valve and its actuator have limited the use of gate valves for the purpose of opening/closing the annulus bore due to space constraints. It is now recognized that a need exists for a more compact gate valve assembly for use in such equipment.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
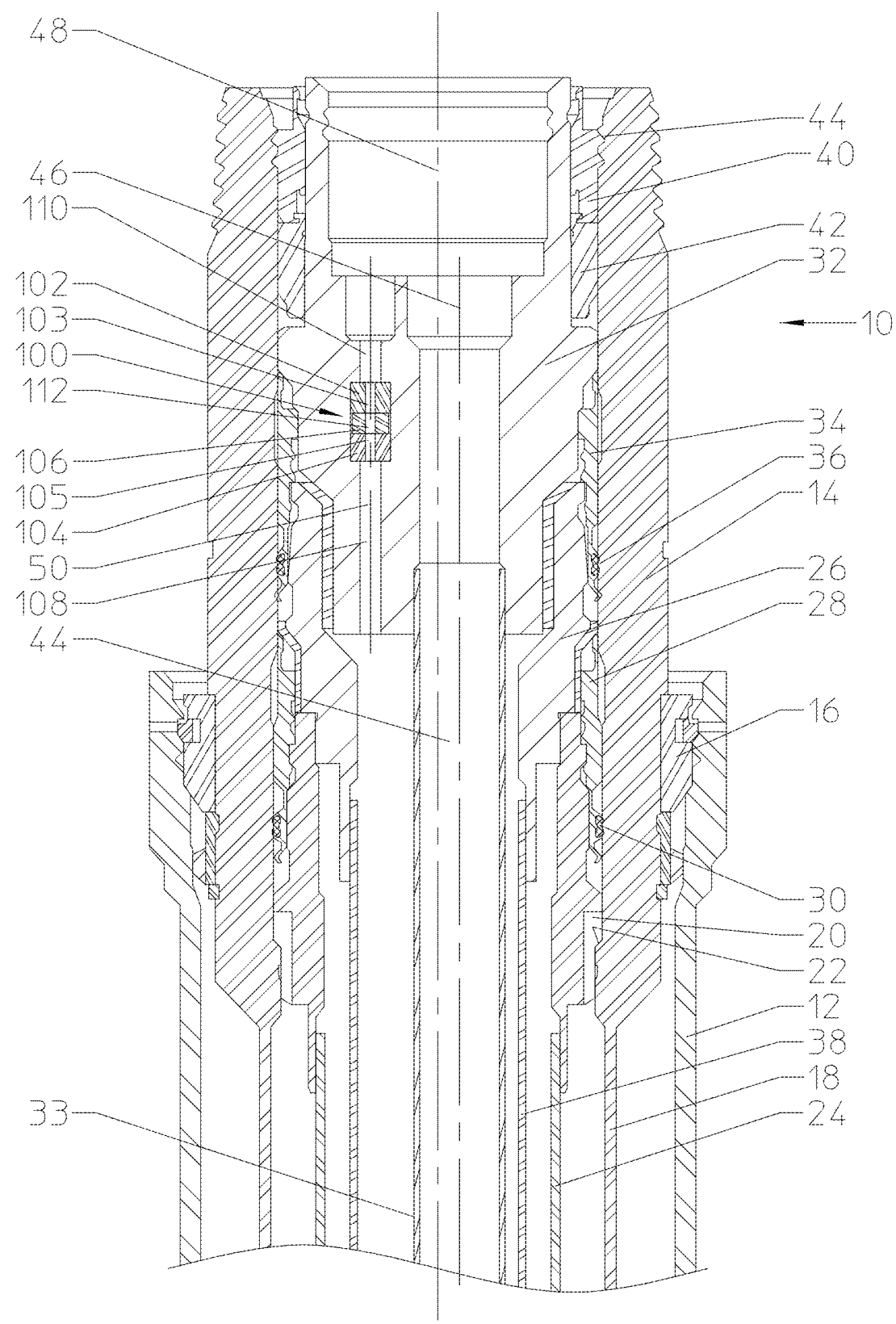
FIG. 1 is a schematic cross-sectional view of a wellhead assembly with a tubing hanger that utilizes a reduced stroke gate valve, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments of the present disclosure may be directed to a reduced stroke gate valve. The reduced stroke gate valve may be used in a variety of contexts wherever a compact gate valve is desired. For example, the disclosed reduced stroke gate valve may be used in surface or subsea tubing hangers, Christmas trees, and/or other flow control devices used in oil and gas wells. The disclosed reduced stroke gate valve is not limited to use in the context of oil and gas wells, but may be similarly applied to fluid flow control devices in other environments that would benefit from the reliability of a gate valve with a relatively compact packaging of the valve actuation component(s).

The disclosed reduced stroke gate valve is a gate valve that provides a predetermined or desired flow area for a given bore size through the gate valve while reducing a total length through which the gate valve strokes between an open position and a closed position.

In traditional gate valve design, the size of the bore along which the gate valve is operated dictates how far the gate must travel in order to move from fully opened to fully closed. The required stroke to move the gate from fully opened to fully closed is multiplied by a certain amount to determine the necessary length of the gate valve actuation system. For example, in certain actuation systems, the actuation system may need to be as much as four times the stroke length used to move the gate from fully opened to fully closed. The gate valve may need to be fit in amongst a plurality of additional bores, connectors, stabs, and control lines in a relatively compact equipment component. As such, it is now recognized that a need exists to reduce the stroke of the gate/seat interface from fully open to fully closed in a gate valve. The disclosed gate valve provides this reduced stroke length, thereby significantly reducing a total length of the actuation system that operates the gate valve. This may help to simplify the layout and operation of equipment components that include the reduced stroke gate valve, as a more compact packaging of the gate valve is possible.

The disclosed reduced stroke gate valve includes one or more openings spanning an area of the gate having a smaller dimension in a direction parallel to a gate actuation direction than in a direction perpendicular to the gate actuation direction. The one or more openings in the gate may provide a flow area equivalent to a predetermined flow area for a single round hole that would otherwise be used for the gate valve application, but with a shape or distribution of openings that provides a considerably reduced stroke length to move the gate valve from the open position to the closed position. In some embodiments, the reduced stroke gate valve may include a single non-circular and/or non-round opening in the gate. The single non-circular and/or non-round opening may be a crescent shaped opening in the gate that reduces the stroke of the valve. However, other non-circular and/or non-round shapes may be utilized as well. In other embodiments, the reduced stroke gate valve may include a plurality of smaller round openings that are arranged in a distribution that reduces the stroke of the valve over that of a single round opening.

The disclosed reduced stroke gate valve provides several advantages over existing gate valves, particularly those used to provide flow through bores in tubing hangers, trees, and similar equipment components. For example, the reduced stroke gate valve greatly reduces the length dimension of the overall valve package with its actuator (e.g., hydraulic, manual, or electric actuator), thereby allowing the gate valve to be packaged in smaller spaces. The disclosed gate valve requires less stroke to move the valve from fully open to fully closed while providing the same flow area as a gate valve with a single conventionally circular or round hole. The shorter overall length of the valve/actuator resulting from the reduced stroke allows for more space efficient packaging of the valve than is currently available using traditional gate valves.

Turning now to the drawings, FIG. 1 depicts an embodiment of a wellhead assembly 10 supporting a tubing hanger therein having a reduced stroke gate valve 100 according to the present disclosure. The assembly 10 as shown includes an outer conductor 12 supporting a wellhead housing 14 by a conventional connector 16. The wellhead housing 14 supports an outer casing 18. A lower casing hanger 20 is shown landed on a support surface 22 of the wellhead housing 14, with an outer casing 24 extending downward from the casing hanger 20. An upper casing hanger 26 is shown landed on the lower casing hanger 20. A pusher sleeve 28 is pressed downward by a setting tool (not shown) so that a seal 30 is in reliable sealing engagement with the wellhead housing 14. A tubing hanger 32 is shown landed on the upper casing hanger 26. The tubing hanger 32 may be landed on an upper casing hanger 26 after the pusher sleeve 34 has previously forced the seal 36 into sealing engagement with the wellhead housing 14. The upper casing hanger 26 supports the inner casing 38, which is commonly referred to as a production casing, and the tubing hanger 32 supports a tubing string 33 positioned within the production casing 38. A locking sub 42 is threadably connected to the tubing hanger 32 and a lockdown member 40 cooperates with internal grooves 44 on the wellhead housing 14 to reliably secure the tubing hanger 32 within the wellhead housing 14.

The tubing hanger 32 generally includes a production bore 44, which may have a central axis 46 spaced from a central axis 48 of the wellhead housing 14 (i.e., the production bore 44 may be eccentric). In other embodiments, though, the production bore 44 may be concentric with its central axis 46 aligned with the central axis 48 of the wellhead housing 14. The tubing hanger 32 also includes an annulus bore 50 that is fluidly isolated from the production bore 44 by the tubing string 33. The annulus bore 50 is thus in fluid communication with the annulus between the production casing 38 and the tubing 33, while the production bore 44 is in fluid communication with the tubing string 33. In some embodiments, the axis 46 of the production bore is aligned with the axis of the upper end of the tubing string 33. The annulus bore 50 at an upper end of the tubing hanger 32 may be in fluid communication with an annulus bore through a subsea tree, flowline connector, or other component connected to an upper end of the tubing hanger 32, as will be understood by one of ordinary skill in the art. Similarly, the production bore 44 extending through the tubing hanger 32 at its upper end may be in fluid communication with a production bore formed through a subsea tree, flowline connector, or other component connected to an upper end of the tubing hanger 32.

As illustrated, the tubing hanger 32 may be equipped with a reduced stroke gate valve 100 in accordance with an embodiment of the present disclosure. For example, the tubing hanger 32 may include the reduced stroke gate valve (hereinafter "gate valve") 100 located along the annulus bore 50. The gate valve 100 may be used to selectively close off the annulus bore 50 as needed during various operations of the tubing hanger 32/wellhead assembly 10. In general, the gate valve 100 may be maintained in a fully open position, as illustrated in FIG. 1, so that the annulus bore 50 provides fluid communication between the annulus (located between the tubing string 33 and the production casing 38) and an annulus bore in a subsea tree or other component located above the tubing hanger 32. The gate valve 100 may be closed as needed, e.g., when performing remedial operations on the wellhead assembly 10 or its associated components, workover operations, retrieving the tubing hanger 32 from the wellhead assembly 10, removing the subsea tree without having to set a wireline plug, etc.

As illustrated, the gate valve 100 may include an upper seat 102, a lower seat 104, and a movable gate 106 located between the upper and lower seats 102 and 104. The upper and lower seats 102 and 104 each include a flowpath (103 and 105, respectively) formed therethrough for routing fluid from a portion 108 of the annulus bore 50 on one side of the gate valve 100 to a portion 110 of the annulus bore 50 on an opposite side of the gate valve 100. The gate 106 includes one or more openings 112 formed therethrough. The opening(s) 112 may have the same cross-sectional area (in a plane perpendicular to the longitudinal axis of the annulus bore 50) as the flowpaths 103, 105 through the upper and lower seats 102, 104. When the gate valve 100 is in the fully open position as shown in FIG. 1, the opening(s) 112 in the gate 106 are aligned with the flowpaths 103, 105 through the upper and lower seats 102, 104. The gate valve 100 may be selectively moved to a closed position in which the gate 106 is shifted in a horizontal direction relative to the seats 102, 104 such that the opening(s) 112 in the gate 106 are not aligned with and do not overlap with the flowpaths 103, 105 through the seats 102, 104. Thus, when the gate valve 100 is shifted to the fully closed position, the gate 106 prevents fluid from flowing from the portion 108 of the annulus bore 50 below the gate valve 100 to the portion 110 of the annulus bore 50 above the gate valve 100.

The gate valve 100 also includes an actuation assembly (not shown in FIG. 1) that selectively moves the gate 106 of the gate valve 100 between the open and closed positions. As discussed in detail below, the one or more openings 112 within the gate 106 of the gate valve 100 span a total area 113 that has a smaller dimension in a direction parallel to a gate actuation direction than in a direction perpendicular to the gate actuation direction. This specific area 113 of the opening(s) 112 facilitates a reduced stroke length for moving the gate valve 100 between the open and closed positions. In embodiments where the gate 106 includes only a single opening 112, the opening 112 has a non-circular and/or non-round shape. In embodiments of the gate valve 100 with multiple openings 112, the openings 112 may be circular (or any other desired shape) but arranged in a distribution that conforms to the shape of the area 113.

Although the disclosed gate valve 100 is described as being used within a tubing hanger 32 (in FIGS. 1 and 2) and a general test fixture (in FIGS. 4-8), it should be noted that the gate valve 100 may be similarly used in other equipment components (e.g., trees, surface tubing hangers, flowline connectors, etc.) where compact packaging of a gate valve is desired.

Figure 2:
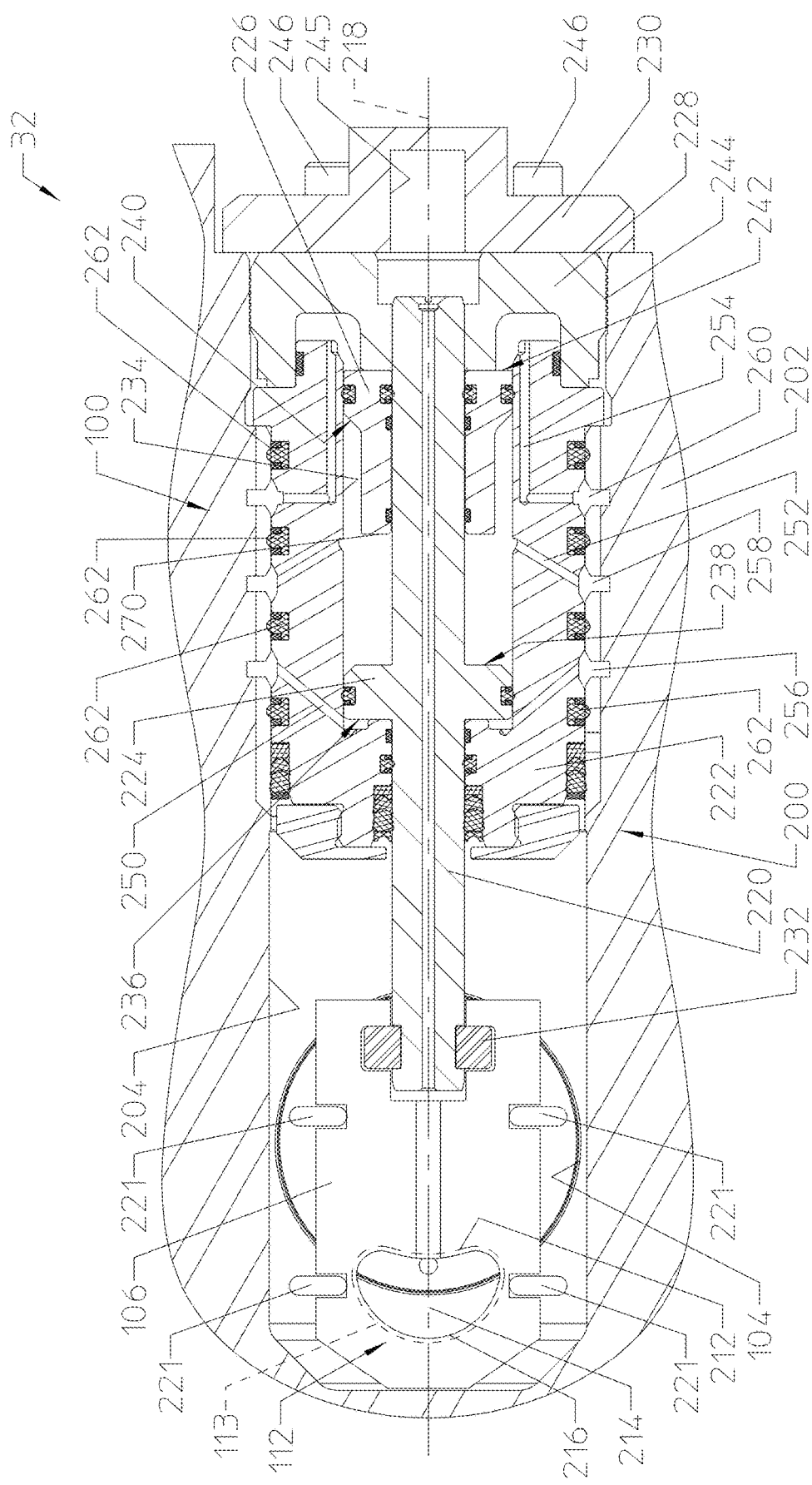
FIG. 2 is a top cutaway view of a reduced stroke gate valve, in accordance with an embodiment of the present disclosure.

FIG. 2 illustrates an embodiment of the gate valve 100 including the gate 106 and a gate valve actuation assembly 200. The gate valve 100 is shown in the fully closed position, such that the one or more openings 112 in the gate 106 do not overlap whatsoever with one or more corresponding openings in the seat (e.g., lower seat 104). As with FIG. 1, the embodiment shown in FIG. 2 has the gate valve 100 disposed within a tubing hanger 32. The tubing hanger 32 includes a body 202 with a single horizontally oriented bore 204 formed therethrough to accommodate the gate valve 100. A length of the bore 204 may be selected to accommodate an overall length of the gate valve 100 including both the gate 106 and the associated gate valve actuation assembly 200. The total length of the gate valve actuation assembly 200, and therefore the bore 204 may be reduced via the non-circular/non-round shape of the area 113 covered by the one or more openings 112 through the gate 106.

The disclosed gate valve 100 includes one or more openings 112 covering a non-circular area 113 formed in the gate 106 to provide an equivalent total flow area (i.e., cross-sectional area in a direction of fluid flow) from the one or more openings 112 as would otherwise be required of a single circular opening in a conventional gate valve used for the same application. The one or more openings 112 arranged in the non-circular or non-round area 113 allows for a reduced stroke length through which the actuation assembly 200 moves the gate valve 100 between the fully open and fully closed positions.

FIG. 2 illustrates an embodiment of the gate valve 100 having a single opening 112 in the gate 106. The opening 112 in the gate 106 is illustrated in a plane of the page in FIG. 2. The opening 112 conforms to a non-circular or non-round area 113 defined by the outer edges of the opening 112. As such, the opening 112 may have a non-circular or non-round shape. The term "non-circular" means that the cross-sectional shape is not equivalent to a circle with all points along the perimeter of the shape being the same distance from a centroid (or geometric center in the plane) of the shape. The term "non-round" means that the cross-sectional shape includes at least one side or portion that does not have a convex shape relative to a centroid (or geometric center in the plane) of the shape. For example, while an elliptical shape would qualify as "non-circular," it does not qualify as "non-round."

In some embodiments, at least one side or portion of the cross-sectional shape may have a concave shape relative to centroid (or geometric center in the plane) of the shape. This is the case with the illustrated shape of the opening 112 in FIG. 2. One side 212 of the shape is concave with respect to a centroid 214 of the shape, while an opposite side 216 of the shape is convex with respect to the centroid 214 of the shape. The concave side 212 is closest to the actuation assembly 200 in a longitudinal direction of the gate valve 100 along axis 218, while the convex side 216 is farthest from the actuation assembly 200 in the longitudinal direction of axis 218. As such, the illustrated shape of the opening 112 may generally be defined as a "crescent shape" curving in a direction away from the actuation assembly 200. In other embodiments, the concave side 212 and convex side 216 may be reversed in terms of proximity to the actuation assembly 200 so that the "crescent shape" curves in a direction toward the actuation assembly 200.

Figure 3A:
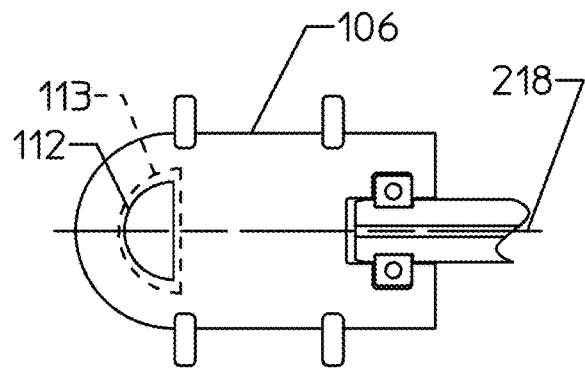
FIGS. 3A-3E illustrate various embodiments of a gate that may be used in a reduced stroke gate valve, in accordance with an embodiment of the present disclosure.
Figure 3B:
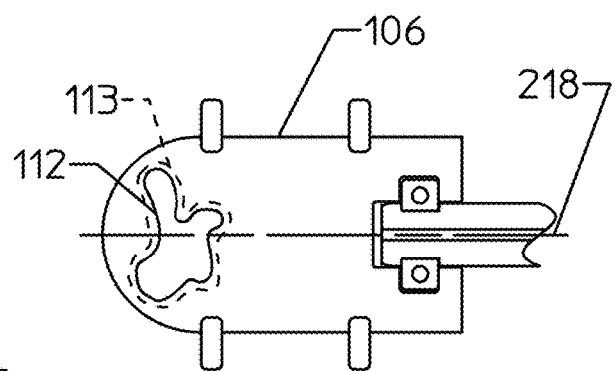
Figure 3C:
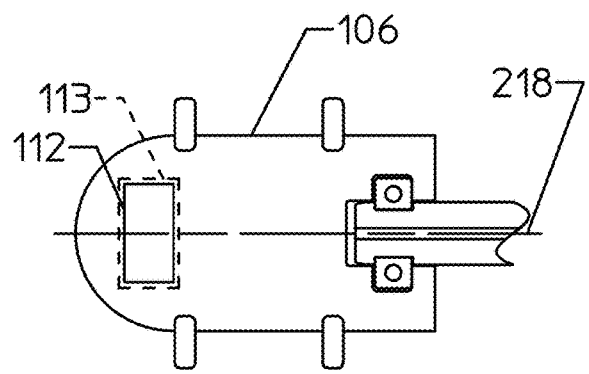
Figure 3D:
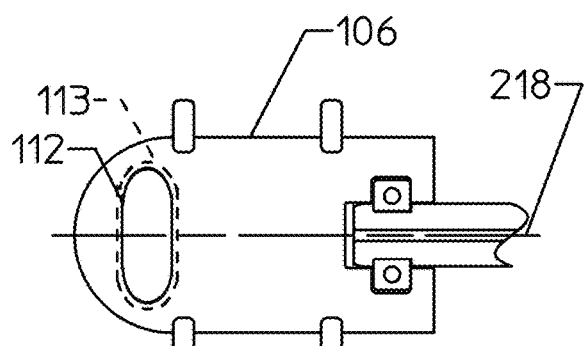

Other non-circular and/or non-round shapes may be used as well for a single opening 112 formed in the gate. For example, in some embodiments, at least one side or portion of the cross-sectional shape may have a straight edge perpendicular to the longitudinal axis 218, instead of a concave shape. For example, the cross-sectional shape of the opening 112 may be equivalent to a semi-circle, or similar semi-rounded shape. Such a shape of the single opening 112 is illustrated in FIG. 3A. In other embodiments, the cross-sectional shape of a single opening 112 in the gate 106 may be an irregular shape that is not symmetric across the longitudinal axis 218, as illustrated in FIG. 3B. The cross-sectional shape of a single opening 112 in the gate 106 may be a rectangular shape (as shown in FIG. 3C) or an elliptical shape (as shown in FIG. 3D).

Figure 3E:
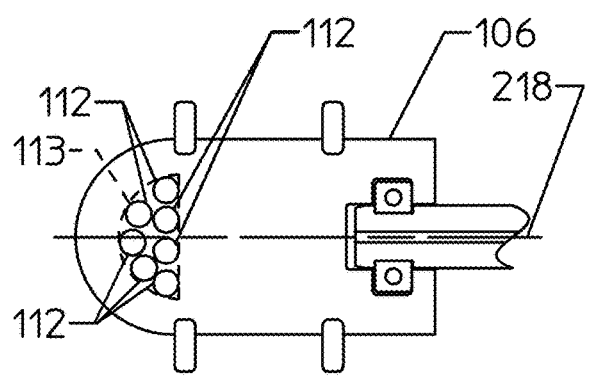

In other embodiments, the gate valve 100 may include multiple openings 112 that span a non-circular or non-round area 113 defined by the outer edges of the group of openings 112. FIG. 3E illustrates an embodiment of the gate 106 having multiple openings 112 formed therein. As shown, the multiple openings 112 may be circular or round in shape, although other shapes may be possible as well. The non-circular or non-round area 113 covered by the group of openings 112 has a shorter dimension in the longitudinal direction of axis 218 than in a direction perpendicular to the axis 218. The cross-sectional area of each of the multiple openings 112 added together equals the required cross-sectional area for the gate valve application. As such, the multiple openings 112 in the gate valve 100 provide a reduced stroke length for the same cross-sectional area as is available using a gate valve with a single circular or round opening.

In any of the above embodiments of FIGS. 2 and 3A-3E, a length of the area 113 spanned by the one or more openings 112 in a direction parallel to the longitudinal axis 218 is shorter than a length of the area 113 spanned by the one or more openings 112 in a direction perpendicular to the longitudinal axis 218 (and in the plane of the page). This reduces the overall length (in the direction of the longitudinal axis 218) through which the actuation assembly 200 strokes the gate 106 between a fully open position and fully closed position. The stroke length of the disclosed gate valve 106 may be only slightly longer than a total length of the area 113 spanned by the opening(s) 112 in the direction parallel to the longitudinal axis 218.

Even with the non-circular or non-round shape of the area covered by the opening(s) 112, the opening(s) 112 maintain a cross-sectional area that is equivalent to a desired or predetermined cross-sectional area for a gate valve being used to seal a particular piece of equipment (e.g., an annulus bore of the tubing hanger 32). For example, regulations for tubing hangers 32 generally dictate that a valve used to open/close the annulus bore maintains a nominal cross-sectional flow area corresponding to, for example, a 1 inch diameter circle or a 2 inch diameter circle. The shape, size, and/or distribution of the opening(s) 112 may be chosen such that to the opening(s) have a total cross-sectional area in the plane of the page equivalent to that of the predetermined or regulatory flow area needed for the gate valve application. Thus, the disclosed gate valve 100 provides a required amount of fluid flow through the valve while it is fully open, and is able to be closed with a shorter stroke length along the longitudinal axis 218 of the gate valve 100.

The disclosed gate valve 100 includes an actuation assembly 200. In the illustrated embodiment, the actuation assembly may include a hydraulically operated actuation assembly. However, other types of actuations assemblies may be used in other embodiments of the gate valve 100, including for example, manual or electric actuators. As shown, the actuation assembly 200 may include, among other things, a stem 220, a piston housing 222, a primary piston 224, a secondary piston 226, a primary cap 228, and a secondary cap 230. The stem 220 is connected to the gate 106 at one end (e.g., via a connector 232) and extends through a chamber 234 defined by the piston housing 222.

The stem 220 is configured to move longitudinally (in the direction of axis 218) with respect to the piston housing 222 and the tubing hanger body 202 to transition the gate 106 between the fully open position and fully closed position. One or more guides 221 may be disposed along and coupled to edges of the gate 106 so as to keep the gate 106 aligned within the bore 204 of the tubing hanger body 202. The guides 221 may have a specific shape to ensure that the gate 106 is maintained in a desired orientation (i.e., parallel to the plane of the page) with respect to the valve seats. The guides 221 may also centralize the gate 106 within the bore 204 while keeping the gate 106 from rotating about the longitudinal axis 218.

The primary piston 224 is either attached to or integral with the stem 220, so that these two components move together. One or more seals on a radially external surface of the primary piston 224 fluidically isolate the chamber 234 on a first side 236 of the piston 224 from the chamber 234 on a second side 238 of the piston 224 while allowing the piston 224 to slide axially within the bore of the piston housing 222.

The secondary piston 226 is separate from and able to move with respect to the stem 220. One or more seals on a radially external surface of the secondary piston 226 fluidically isolate the chamber 234 on a first side 240 of the piston 226 from the chamber 234 on a second side 242 of the piston 226 while allowing the piston 226 to slide axially along the bore of the piston housing 222. The secondary piston 226 may also include a bore formed therethrough, wherein the stem 220 passes through this bore, and one or more seals located between the bore of the piston 226 and the stem 220.

The piston housing 222 may be secured within the bore 204 of the tubing hanger housing 202 via primary cap 228. The primary cap 228 may include a bore formed therethrough, wherein the stem 220 passes at least partially through this bore, and one or more seals located between the bore of the primary cap 228 and the stem 220. The primary cap 228 is coupled to an end of the piston housing 222 extending away from the gate 106. The primary cap 228 may be secured to the tubing hanger housing 202 via a threaded connector 244 that engages threads formed along an end of the bore 204 proximate an external surface of the housing 202.

The secondary cap 230 may be secured over the primary cap 228 and other actuation assembly components to keep the actuation assembly 200 within the bore 204 of the housing 202. The secondary cap 230 may provide some additional length to accommodate the full stroke of the stem 222. Specifically, the secondary cap 230 may include a bore or space 245 formed at least partially therethrough to receive an end of the stem 222 during opening of the gate valve 100. The secondary cap 230 may be secured to one or both of the primary cap 228 and the housing 202 via a series of bolts 246.

The piston housing 222 may include a series of hydraulic fluid ports formed therethrough to direct hydraulic fluid for actuating the pistons 224/226, stem 222, and gate 106 between open and closed valve positions. The piston housing 222 may include a first one or more ports 250 extending from a radially external surface of the piston housing 222 to the chamber 234 on the first side 236 of the primary piston 224. The piston housing 222 may include a second one or more ports 252 extending from a radially external surface of the piston housing 222 to the chamber 234 on the second side 238 of the primary piston 224/first side 240 of the secondary piston 226. The piston housing 222 may include a third one or more ports 254 extending from a radially external surface of the piston housing 222 to the chamber 234 on the second side 242 of the secondary piston 226.

As illustrated, the tubing hanger body 202 may include three hydraulic galleries 256, 258, and 260 formed circumferentially around the bore 204 and in hydraulic communication with the ports 250, 252, and 254, respectively. The presence of the hydraulic galleries 256, 258, and 260 allows hydraulic fluid to be communicated through the ports 250, 252, and 254 in the piston housing 222 regardless of an orientation of the piston housing 222 relative to the bore 204 of the tubing hanger body 202. One or more hydraulic fluid lines formed through the tubing hanger body 202 may provide hydraulic fluid to and/or from each of the galleries 256, 258, and 260 for operating the actuation assembly 200. Seals 262 positioned at an interface between the piston housing 222 and the bore 204 of the tubing hanger body 202 fluidly isolate each of the galleries 256, 258, and 260 from each other.

Having described the general layout of the actuation assembly 200 used to open and close the disclosed gate valve 100, a more detailed description of the actuation operations will now be provided. For ease of understanding, reference will be made to FIGS. 6-8, which show the gate valve 100 disposed within a test fixture 500. The test fixture 500 represents any desired equipment component (e.g., tubing hanger, tree, flowline connector, etc.) having a flow bore therethrough that may be selectively closed using a gate valve in accordance with the disclosed embodiments.

Figure 4:
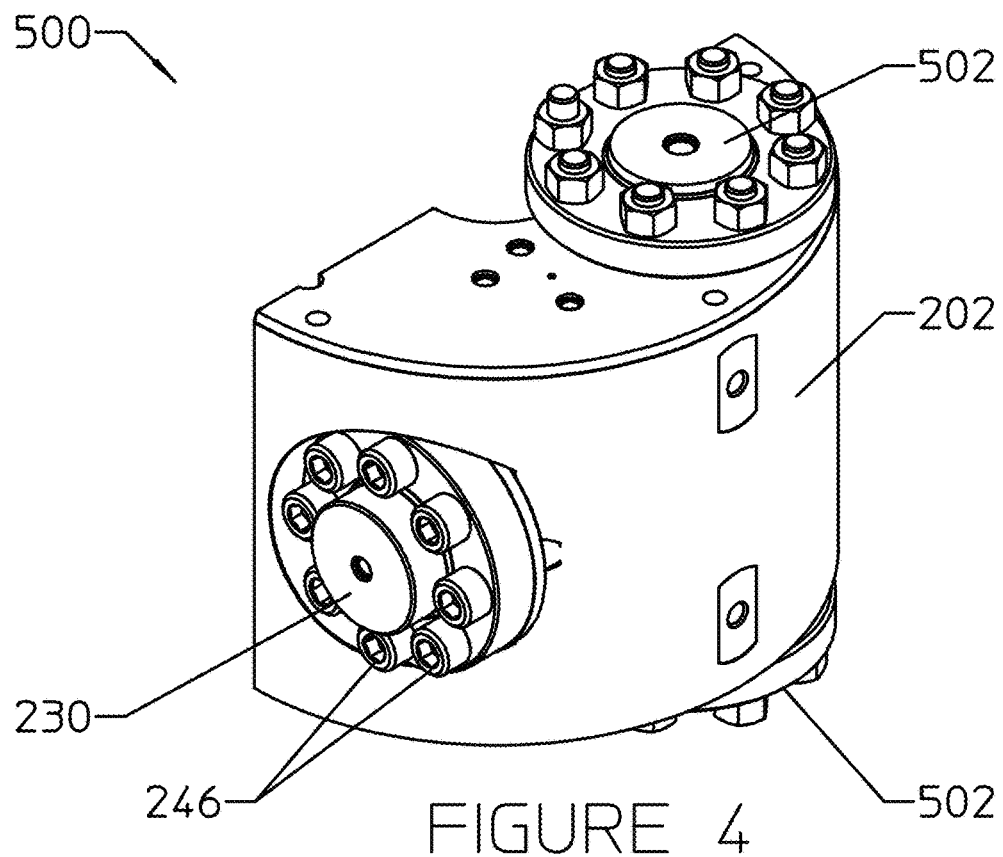
FIG. 4 is a perspective cutaway view of a test fixture equipped with the reduced stroke gate valve of FIG. 2, in accordance with an embodiment of the present disclosure.
Figure 5:
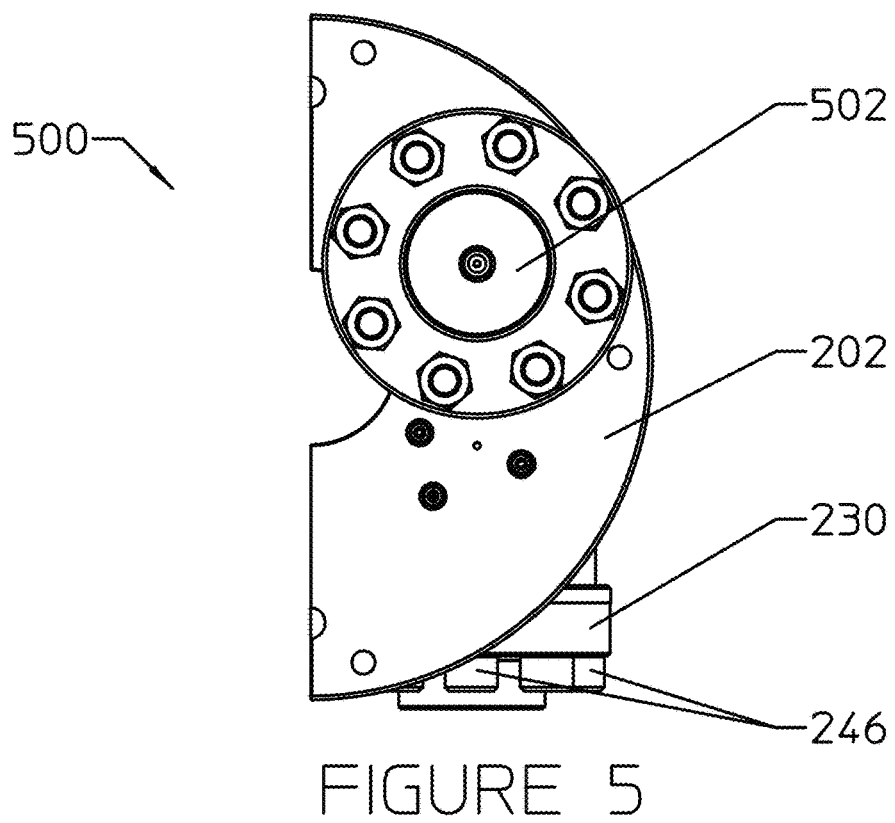
FIG. 5 is a top cutaway view of the test fixture of FIG. 4, in accordance with an embodiment of the present disclosure.

Perspective and top views of a section of the overall test fixture 500 are shown in FIGS. 4 and 5. These figures show the test fixture 500 having a body 200, vertically oriented caps 502 located on opposing ends of an annulus bore through the test fixture, and the secondary cap 230 and its associated bolts 246 extending from a lateral edge of the body 200. As can be clearly seen in FIGS. 4 and 5, the cap 230 extends only slightly outside of the body 200 of the test fixture 500 and does not significantly increase the dimensions of the overall test fixture 500. This is due to the relatively compact size of the actuation assembly of the disclosed gate valve having a reduced stroke length. In addition, the compact size of the actuation assembly of the gate valve frees up additional space for other fluid, electrical, and communication lines to be routed through other portions of the body 202 of the test fixture 500.

Figure 6:
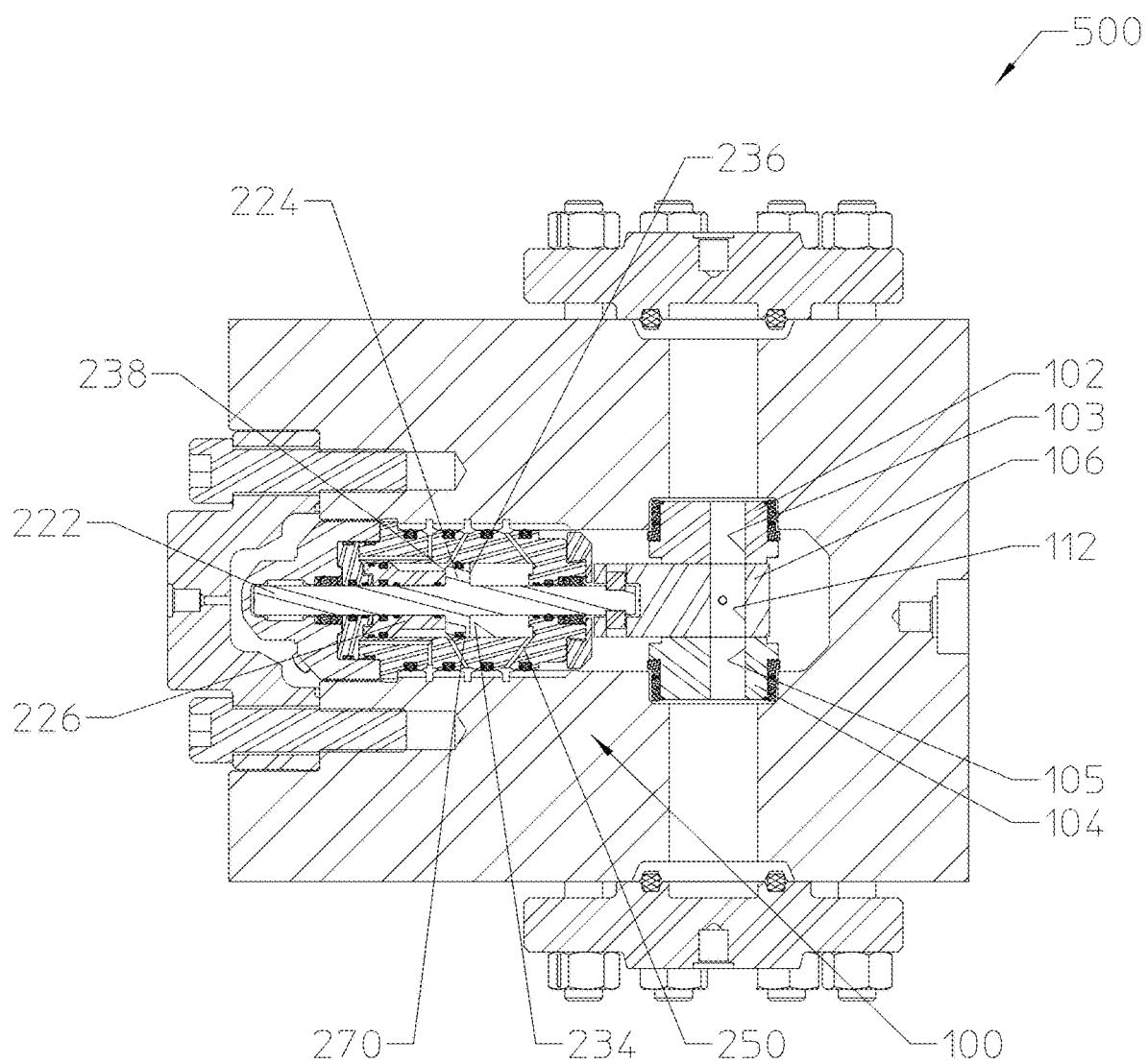
FIG. 6 is a side cross-sectional view of the test fixture of FIGS. 4 and 5 with the reduced stroke gate valve in an open position, in accordance with an embodiment of the present disclosure.
Figure 7:
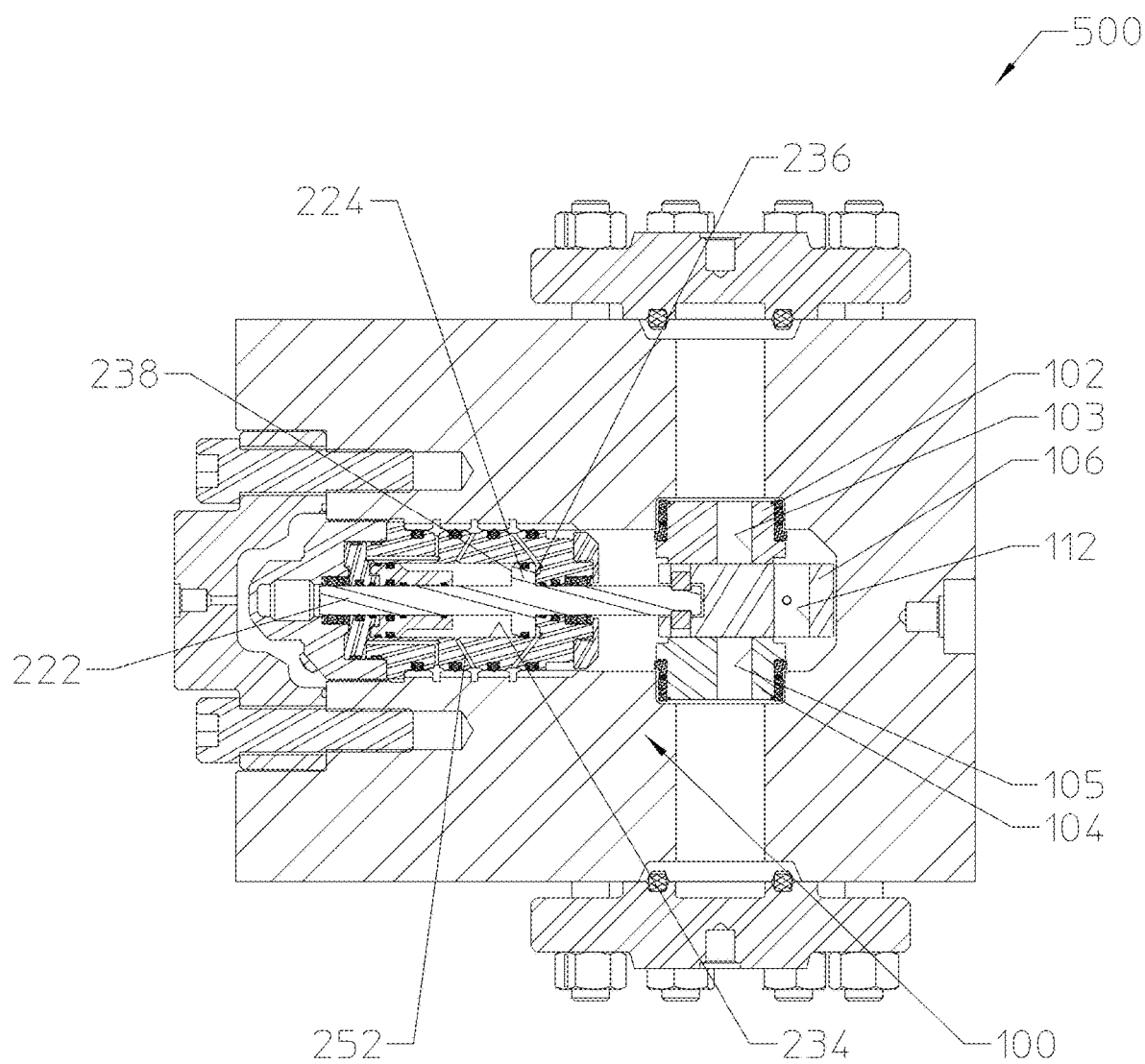
FIG. 7 is a side cross-sectional view of the test fixture of FIGS. 4 and 5 with the reduced stroke gate valve in a first closed position, in accordance with an embodiment of the present disclosure.
Figure 8:
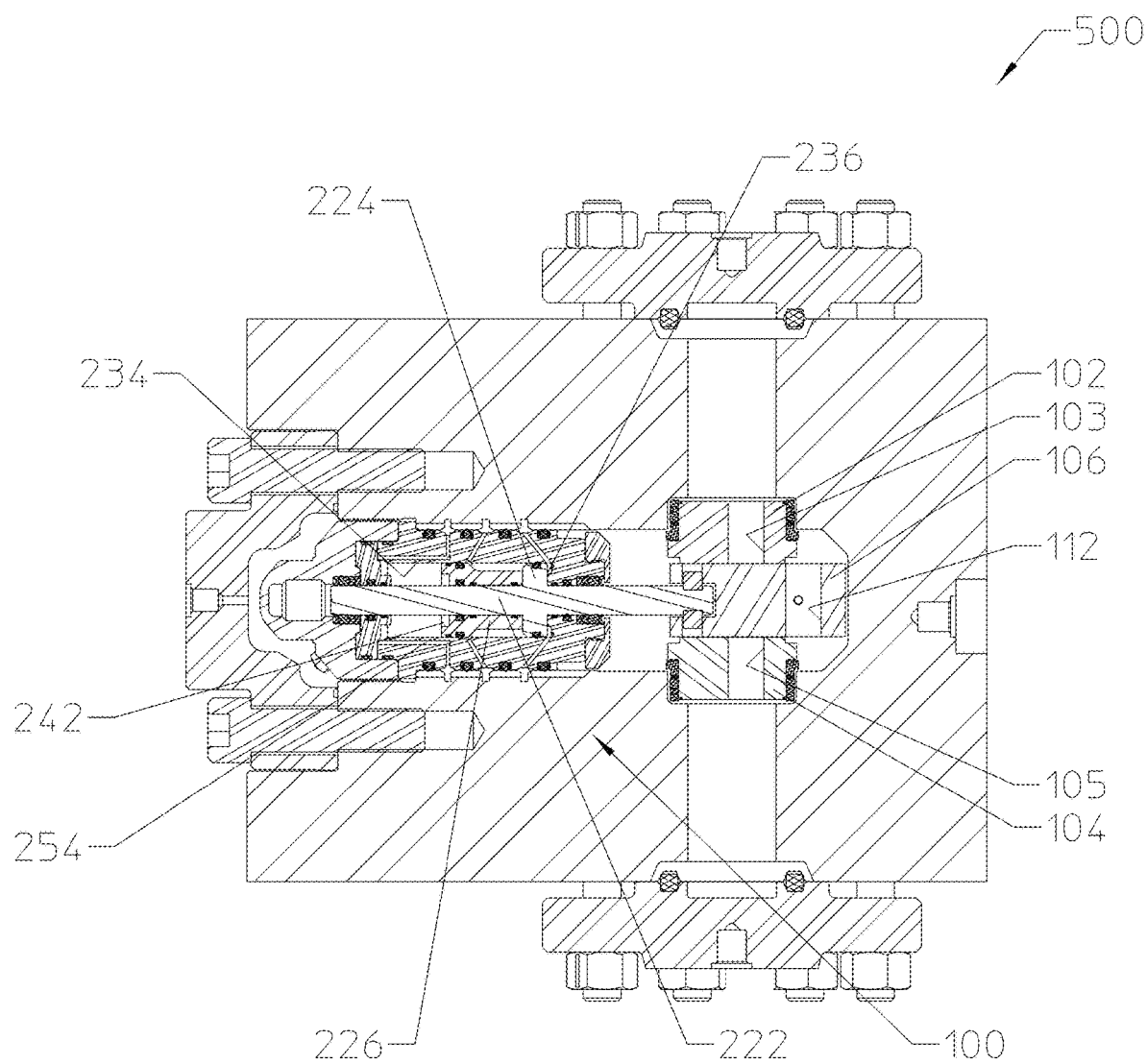
FIG. 8 is a side cross-sectional view of the test fixture of FIGS. 4 and 5 with the reduced stroke gate valve in a second closed position, in accordance with an embodiment of the present disclosure.

Turning to FIGS. 6-8, gate valve actuation operations will now be described. To open the gate valve 100, hydraulic fluid may be communicated through the first port(s) 250 to the chamber 234 on the first side 236 of the primary piston 224. As illustrated in FIG. 6, this hydraulic fluid communication increases the pressure on the first side 236 of the primary piston 224, thereby urging the piston 224 in a direction toward the capped end of the assembly. The piston 224 moves the stem 222 and connected gate 106 in this direction as well, until the opening(s) 112 in the gate 106 are brought into alignment with the flowpaths 103 and 105 through the valve seats 102 and 104, respectively. At this point, the second end 238 of the primary piston 224 abuts a shoulder 270 of the secondary piston 226, which stops the longitudinal motion of the stem 222 upon the gate valve 100 reaching the fully open position of FIG. 6.

To close the gate valve 100, hydraulic fluid may be communicated through the second port(s) 252 to the chamber 234 on the second side 238 of the primary piston 224. As illustrated in FIG. 7, this hydraulic fluid communication increases the pressure on the second side 238 of the primary piston 224, thereby urging the piston 224 back in a direction away from the capped end of the actuation assembly. The piston 224 moves the stem 222 and connected gate 106 in this direction as well, until the opening(s) 112 in the gate 106 are no longer overlapping with the flowpaths 103 and 105 through the valve seats 102 and 104, respectively. At this point, the first end 236 of the primary piston 224 abuts an end of the chamber 234, which stops the longitudinal motion of the stem 222 upon the gate valve 100 reaching the fully closed position of FIG. 7.

In the event that the gate valve 100 does not respond properly to fluid communicated through the second port(s) 252, as described above with reference to FIG. 7, the third port(s) 254 may be used to close the gate valve 100. This may be needed, for example, in the event that one or more seals of the actuation assembly fail. To close the gate valve 100 in this situation, hydraulic fluid may be communicated through the third port(s) 254 to the chamber 234 on the second side 242 of the secondary piston 226. As illustrated in FIG. 8, this hydraulic fluid communication increases the pressure on the second side 242 of the secondary piston 226, thereby urging the piston 226 in the longitudinal direction away from the capped end of the actuation assembly. The piston 226 moves both the piston 224 and the connected stem 222 and gate 106 in this direction as well, until the opening(s) 112 in the gate 106 are no longer overlapping with the flowpaths 103 and 105 through the valve seats 102 and 104, respectively. At this point, the first end 236 of the primary piston 224 abuts an end of the chamber 234, which stops the longitudinal motion of the piston 226 and the stem 222 upon the gate valve 100 reaching the fully closed position of FIG. 8. As such, the secondary piston 226 serves as a back-up for the primary piston 224 in closing the gate valve 100.

While the above described actuation operations of the gate valve 100 are taking place, hydraulic fluid must be vented from certain sections of the chamber 234 as the pistons 224/226 move. The hydraulic fluid may be vented via the same fill ports used to supply hydraulic fluid, or through separate vent ports (not shown).

Due to the various actuation operations that may be performed using the actuation assembly 200 of FIGS. 2 and 6-8, the required stroke length to move the gate 106 from fully open to fully closed may be multiplied four times to provide the overall length of the actuation assembly 200. This is because each piston 224/226 must be able to move the full length of the gate valve stroke in each direction to provide the desired flexibility of operation in the actuation assembly 200. Thus, reducing the stroke length via the non-circular or non-round shape of the area 113 spanned by the gate valve opening(s) 112 provides a large reduction in the overall length of the actuation assembly 200 and greater ease of incorporating the actuation assembly 200 into compact equipment installations.

It should be noted that other arrangements of the hydraulic fluid port(s), chamber(s), piston(s), etc. may be used to actuate the disclosed gate 106 between open and closed positions. For example, in some embodiments, the secondary piston 226 and third port(s) 254 may not be present. In some embodiments, the actuation system may move the gate 106 in opposite directions to open/close the valve 100 (e.g., closing the valve by pulling the gate 106 toward the capped end and opening the valve by extending the gate 106 away from the capped end). These various embodiments of the actuation assembly 200 may similarly benefit from the reduced overall stroke length of the gate 106 provided via the non-circular and/or non-round area spanned by the opening(s) 112.

As noted previously, the gate valve 100 may be utilized with other types of actuation assemblies 200, including manual or electric actuation assemblies. The reduced stroke of the gate still applies in these instances and will help reduce the overall length of the gate valve assembly 100 for more compact packaging of the valve.

Although the present disclosure and its advantages have been described in detail, it should be understood that various changes, substitutions and alterations can be made herein without departing from the spirit and scope of the disclosure as defined by the following claims.

What is claimed is:

1. A gate valve comprising:
   a first valve seat and a second valve seat spaced apart, wherein each of the first valve seat and the second valve seat comprise a flowpath formed therethrough;
   a gate, wherein movement of the gate in a direction of a longitudinal axis of the gate valve with respect to the first and second valve seats transitions the gate valve between an open position and a closed position;
   wherein the gate comprises one or more openings formed therein, the one or more openings extending through a thickness of the gate, the one or more openings collectively spanning an area having:
   a first dimension in a direction parallel to the longitudinal axis of the gate valve; and
   a second dimension in a direction perpendicular to the longitudinal axis of the gate valve, wherein the second dimension is longer than the first dimension;
   a stem coupled to the gate, the stem having a primary piston disposed thereon and extending radially therefrom, the primary piston being configured to move through a chamber and engage a shoulder of a secondary piston; and
   a first port and a second port for delivering hydraulic fluid to the chamber, wherein:
   for opening the gate, the hydraulic fluid is communicated through the first port to the chamber on a first side of the primary piston, thereby moving the primary piston until the primary piston engages the shoulder of the secondary piston, and
   for closing the gate, the hydraulic fluid is communicated through the second port to the chamber on a second side of the primary piston.

2. The gate valve of claim 1, wherein the one or more openings comprise only a single opening having a non-circular cross-sectional shape.

3. The gate valve of claim 2, wherein the cross-sectional shape of the single opening is crescent shaped having one side concave with respect to a centroid of the cross-sectional shape and an opposite side convex with respect to the centroid of the cross-sectional shape.

4. The gate valve of claim 2, wherein the cross-sectional shape of the single opening is an irregular shape that is not symmetric across the longitudinal axis of the gate valve.

5. The gate valve of claim 2, wherein the single opening has a rectangular cross-sectional shape.

6. The gate valve of claim 2, wherein the single opening has an elliptical cross-sectional shape.

7. The gate valve of claim 2, wherein the cross-sectional shape of the single opening is a semi-circle having a straight edge perpendicular to the longitudinal axis of the gate valve.

8. The gate valve of claim 1, wherein the one or more openings comprise multiple openings distributed throughout a non-circular area within the gate.

9. A tubing hanger system, comprising:
a tubing hanger body;
an annulus bore formed through the tubing hanger body; and
a gate valve disposed in the tubing hanger body, the gate valve comprising:
a first valve seat and a second valve seat spaced apart, wherein each of the first valve seat and the second valve seat comprise a flowpath formed therethrough;
a gate, wherein movement of the gate in a direction of a longitudinal axis of the gate valve with respect to the first and second valve seats transitions the gate valve between an open position and a closed position;
wherein the gate comprises one or more openings formed therein, the one or more openings extending through a thickness of the gate, the one or more openings collectively spanning an area having:
a first dimension in a direction parallel to the longitudinal axis of the gate valve; and
a second dimension in a direction perpendicular to the longitudinal axis of the gate valve, wherein the second dimension is longer than the first dimension;
a stem coupled to the gate, the stem having a primary piston disposed thereon and extending radially therefrom, the primary piston being configured to move through a chamber and engage a shoulder of a secondary piston; and
a first port and a second port for delivering hydraulic fluid to the chamber, wherein:
for opening the gate, the hydraulic fluid is communicated through the first port to the chamber on a first side of the primary piston, thereby moving the primary piston until the primary piston engages the shoulder of the secondary piston, and
for closing the gate, the hydraulic fluid is communicated through the second port to the chamber on a second side of the primary piston.

10. The tubing hanger system of claim 9, wherein the one or more openings comprise multiple openings distributed throughout a non-circular area within the gate.

11. The tubing hanger system of claim 10, wherein the one or more openings comprise only a single opening having a non-circular cross-sectional shape.

12. The tubing hanger system of claim 11, wherein the single opening has a rectangular or elliptical cross-sectional shape.

13. The tubing hanger system of claim 11, wherein the cross-sectional shape of the single opening is crescent shaped having one side concave with respect to a centroid of the cross-sectional shape and an opposite side convex with respect to the centroid of the cross-sectional shape.

14. The tubing hanger system of claim 11, wherein the cross-sectional shape of the single opening is an irregular shape that is not symmetric across the longitudinal axis of the gate valve.

15. The tubing hanger system of claim 11, wherein the cross-sectional shape of the single opening is a semi-circle having a straight edge perpendicular to the longitudinal axis of the gate valve.

16. A method comprising:
providing a gate valve comprising:
a first valve seat and a second valve seat spaced apart, wherein each of the first valve seat and the second valve seat comprise a flowpath formed therethrough;
a gate, wherein movement of the gate in a direction of a longitudinal axis of the gate valve with respect to the first and second valve seats transitions the gate valve between an open position and a closed position;
wherein the gate comprises one or more openings formed therein, the one or more openings extending through a thickness of the gate, the one or more openings collectively spanning an area having:
a first dimension in a direction parallel to the longitudinal axis of the gate valve; and
a second dimension in a direction perpendicular to the longitudinal axis of the gate valve, wherein the second dimension is longer than the first dimension;
a stem coupled to the gate, the stem having a primary piston disposed thereon and extending radially therefrom, the primary piston being configured to move through a chamber and engage a shoulder of a secondary piston; and
a first port and a second port for delivering hydraulic fluid to the chamber, wherein:
for opening the gate, the hydraulic fluid is communicated through the first port to the chamber on a first side of the primary piston, thereby moving the primary piston until the primary piston engages the shoulder of the secondary piston, and
for closing the gate, the hydraulic fluid is communicated through the second port to the chamber on a second side of the primary piston; and
moving the gate in a direction of the longitudinal axis of the gate valve with respect to the first and second valve seats to transition the gate valve between an open position and a closed position.

17. The method of claim 16, wherein the one or more openings comprise multiple openings distributed throughout a non-circular area within the gate.

18. The method of claim 16, wherein the one or more openings comprise only a single opening having a non-circular cross-sectional shape.

19. The method of claim 18, wherein the single opening has a rectangular cross-sectional shape, an elliptical cross-sectional shape, or an irregular cross-sectional shape that is not symmetric across the longitudinal axis of the gate valve.

20. The method of claim 16, wherein configuration of the one or more openings with the first valve seat and the second valve seat provides for a shorter stroke length when moving the gate in the direction of the longitudinal axis of the gate valve in comparison to another gate valve having a circular opening while providing the same or more cross sectional flow area.

\* \* \* \* \*